(12) United States Patent
Feng et al.

(10) Patent No.: US 11,836,619 B2
(45) Date of Patent: Dec. 5, 2023

(54) IMAGE PROCESSING METHOD, RELATED DEVICE, AND COMPUTER STORAGE MEDIUM

(71) Applicants: Huawei Technologies Co., Ltd., Shenzhen (CN); Institute of Automation, Chinese Academy of Sciences, Beijing (CN)

(72) Inventors: Bailan Feng, Beijing (CN); Chunfeng Yao, Beijing (CN); Kaiqi Huang, Beijing (CN); Zhang Zhang, Beijing (CN); Xiaotang Chen, Beijing (CN); Houjing Huang, Beijing (CN); Dangwei Li, Beijing (CN)

(73) Assignees: Huawei Technologies Co., Ltd., Shenzhen (CN); Institute of Automation, Chinese Academy of Sciences, Beijing (CN)

( * ) Notice: Subject to any disclaimer, the term of this patent is extended or adjusted under 35 U.S.C. 154(b) by 684 days.

(21) Appl. No.: 17/039,544

(22) Filed: Sep. 30, 2020

(65) Prior Publication Data
US 2021/0027094 A1    Jan. 28, 2021

Related U.S. Application Data

(63) Continuation of application No. PCT/CN2018/088758, filed on May 28, 2018.

(51) Int. Cl.
*G06N 3/08* (2023.01)
*G06N 20/00* (2019.01)
(Continued)

(52) U.S. Cl.
CPC ............. *G06N 3/08* (2013.01); *G06F 18/213* (2023.01); *G06N 20/00* (2019.01); *G06T 3/4007* (2013.01);
(Continued)

(58) Field of Classification Search
CPC .......... G06N 3/08; G06N 3/044; G06N 3/045; G06N 3/047; G06N 3/084; G06N 5/046;
(Continued)

(56) References Cited

U.S. PATENT DOCUMENTS

2013/0287251 A1   10/2013   Mitsui et al.
2017/0185864 A1    6/2017   Nicoara et al.

FOREIGN PATENT DOCUMENTS

CN    101996401 A    3/2011
CN    104123532 A   10/2014
(Continued)

OTHER PUBLICATIONS

English translation of written opinion on related PCT/CN2018/088758 application. (Year: 2019).*
(Continued)

*Primary Examiner* — Daniel G Mariam
(74) *Attorney, Agent, or Firm* — Leydig, Voit & Mayer, Ltd.

(57) ABSTRACT

An image processing method, a related device, and a computer storage medium are provided. The method includes: obtaining a feature intensity image corresponding to a training image, where an intensity value of a pixel in the feature intensity image is used to indicate importance of the pixel for recognizing the training image, and resolution of the training image is the same as resolution of the feature intensity image; and occluding, based on the feature intensity image, a to-be-occluded region in the training image by using a preset window, to obtain a new image, where the to-be-occluded region includes a to-be-occluded pixel, and the new image is used to update an image recognition model. According to the embodiments of the present application, a prior-art problem that a model has low accuracy and rela-
(Continued)

Obtain a feature intensity image corresponding to a training image — S102

Occlude, based on the feature intensity image, a to-be-occluded region in the training image by using a preset window, to obtain a new image — S104 tively poor generalization performance because of limited training data can be resolved.

20 Claims, 4 Drawing Sheets

(51) Int. Cl.
    *G06T 3/40* (2006.01)
    *G06F 18/213* (2023.01)
    *G06V 10/774* (2022.01)
    *G06V 20/52* (2022.01)
    *G06N 3/084* (2023.01)
    *G06N 5/046* (2023.01)

(52) U.S. Cl.
    CPC ............ *G06V 10/774* (2022.01); *G06V 20/52* (2022.01); *G06N 3/084* (2013.01); *G06N 5/046* (2013.01)

(58) Field of Classification Search
    CPC ...... G06N 20/00; G06V 10/774; G06V 20/52; G06F 18/213; G06T 3/4007
    See application file for complete search history.

(56) References Cited

FOREIGN PATENT DOCUMENTS

| CN | 104504365 A | 4/2015 |
|---|---|---|
| CN | 106156691 A | 11/2016 |
| CN | 106339665 A | 1/2017 |
| CN | 106529448 A | 3/2017 |
| CN | 106980825 A | 7/2017 |

OTHER PUBLICATIONS

Zeiler et al., "Visualizing and Understanding Convolutional Networks," ECCV 2014, Part I, LNCS 8689, pp. 818-833, Springer International Publishing Switzerland (2014).

Wang et al., "A-Fast-RCNN: Hard Positive Generation via Adversary for Object Detection," 2017 IEEE Conference on Computer Vision and Pattern Recognition, CVPR, pp. 3039-3048 (2017).

Zhong et al., "Random Erasing Data Augmentation," arXiv:1708.04896v2 [cs.CV], total 10 pages (Nov. 16, 2017).

Zheng et al., "Unlabeled Samples Generated by GAN Improve the Person Re-identification Baseline in vitro," ICCV 2017, pp. 3754-3762 (2017).

* cited by examiner

IMAGE PROCESSING METHOD, RELATED DEVICE, AND COMPUTER STORAGE MEDIUM

CROSS-REFERENCE TO RELATED APPLICATIONS

This application is a continuation of International Application No. PCT/CN2018/088758, filed on May 28, 2018, which is hereby incorporated by reference in its entirety.

TECHNICAL FIELD

Embodiments of the present application relate to the field of image processing technologies, and in particular, to an image processing method, a related device, and a computer storage medium.

BACKGROUND

As people pay increasing attention to social public security and an urban surveillance network is widely applied, a large quantity of surveillance cameras are applied in public places to perform video (image) surveillance. Pedestrian re-recognition is a basic task in the video surveillance, and is intended to recognize whether pedestrian images photographed by different cameras are images of the same pedestrian.

Currently, a pedestrian re-recognition task is mainly affected by obstacles, changes of visual angles, and relatively high similarity in features of different pedestrians, such as clothing and body shapes. Consequently, accuracy of pedestrian recognition based on a conventional model is low. Specifically, training data used by the conventional model is relatively limited, and consequently, the model has poor generalization performance, and the accuracy of the pedestrian recognition based on the model is low.

To resolve the foregoing problem, an augmentation method of existing training data mainly includes: randomly flipping an image, randomly cropping a plurality of image regions, randomly perturbing a pixel value of an image, and the like. However, in practice, it is found that an existing data augmentation method is to augment training data based on a surface form, and the accuracy of the model cannot be greatly improved.

SUMMARY

Embodiments of the present application disclose an image processing method, a related device, and a computer storage medium, to resolve a prior-art problem that a model has low accuracy because of limited training data.

According to a first aspect, an embodiment of the present application provides an image processing method, where the method includes:
  obtaining a feature intensity image corresponding to a training image, where an intensity value of a pixel in the feature intensity image is used to indicate importance of the pixel for recognizing the training image, and resolution of the training image is the same as resolution of the feature intensity image; and
  occluding, based on the feature intensity image, a to-be-occluded region in the training image by using a preset window, to obtain a new image, where the to-be-occluded region includes a to-be-occluded pixel, and the new image is used to update an image recognition model.

Specifically, a terminal device determines, based on the feature intensity image, the to-be-occluded region in the training image; and then occludes the to-be-occluded region by using the preset window, to obtain the new image. The to-be-occluded region includes one or more to-be-occluded pixels. The preset window is self-defined on a user side or on a system side, and attribute features of the preset window, such as a size and a shape, are not limited. For example, the preset window may be a matrix box, a rhombus, or a sector shape.

In some possible embodiments, the occluding, based on the feature intensity image, a to-be-occluded region in the training image by using a preset window, to obtain a new image includes: determining a mapped pixel based on the intensity value of the pixel in the feature intensity image, where the mapped pixel is a pixel that is in the feature intensity image and whose intensity value meets a preset condition; and occluding the to-be-occluded pixel by using a preset window, to obtain a new image, where the to-be-occluded pixel is a pixel that is in the training image and that corresponds to the mapped pixel.

The preset condition may be self-defined on a user side or on a system side. For example, when a larger pixel value of a pixel indicates higher importance of the pixel for recognizing an image, the preset condition may be that an intensity value is greater than or equal to a first preset intensity; that is, a pixel whose intensity value is greater than or equal to the first preset intensity is selected as the mapped pixel. On the contrary, when a smaller pixel value of a pixel indicates higher importance of the pixel for recognizing an image, the preset condition may be that an intensity value is less than or equal to a second preset intensity; that is, a pixel whose intensity value is less than or equal to the second preset intensity is selected as the mapped pixel.

In some possible embodiments, the mapped pixel is obtained by using a polynomial sampling algorithm. Specifically, the terminal device may determine the mapped pixel from the feature intensity image based on the polynomial sampling algorithm and intensity values of all pixels in the feature intensity image.

In some possible embodiments, there are a plurality of mapped pixels, and the to-be-occluded pixel includes any one or more pixels that are in the training image and that correspond to the mapped pixels. In other words, the to-be-occluded pixel and the mapped pixel may be in a one-to-one correspondence, or may not be in a one-to-one correspondence.

In some possible embodiments, the obtaining a feature intensity image corresponding to a training image includes:
  occluding the training image by using a sliding window, to obtain m occluded images, where m is a positive integer;
  inputting the m occluded images into the image recognition model, to obtain respective recognition scores of the m occluded images, where the recognition scores are used to reflect importance of regions occluded by the sliding window in the occluded images for recognizing the training image; and
  determining, based on an image interpolation algorithm and the respective recognition scores of the m occluded images, the feature intensity image corresponding to the training image.

The image interpolation algorithm includes but is not limited to any one of the following: a bilinear interpolation algorithm, a Lanczos interpolation algorithm, a cubic convolution interpolation algorithm, a nearest neighbor interpolation algorithm, a piecewise linear interpolation algorithm, and another algorithm used for image interpolation.

In some possible embodiments of the present application, the determining, based on an image interpolation algorithm and the respective recognition scores of the m occluded images, the feature intensity image corresponding to the training image includes:

determining, based on the respective recognition scores of the m occluded images, intensity values of m pixels in the feature intensity image; and determining, based on the image interpolation algorithm and the intensity values of the m pixels in the feature intensity image, intensity values of all pixels in the feature intensity image, to obtain the feature intensity image.

In some possible embodiments of the present application, the determining, based on an image interpolation algorithm and the respective recognition scores of the m occluded images, the feature intensity image corresponding to the training image includes:

determining, based on the respective recognition scores of the m occluded images, intensity values of m pixels in an initial intensity image;

determining, based on the image interpolation algorithm and the intensity values of the m pixels in the initial intensity image, intensity values of all pixels in the initial intensity image; and determining, based on the recognition scores of the training image and the intensity values of all the pixels in the initial intensity image, intensity values of all pixels in the feature intensity image, to obtain the feature intensity image, where the recognition scores of the training image are obtained by inputting the training image into the image recognition model.

In some possible embodiments of the present application, the obtaining a feature intensity image corresponding to a training image includes:

inputting the training image into the image recognition model, and performing a forward operation and a reverse operation on the training image, to obtain a corresponding gradient data block, where a size of the gradient data block is the same as the resolution of the training image; and determining, based on the gradient data block, the feature intensity image corresponding to the training image.

In some possible embodiments of the present application, the obtaining a feature intensity image corresponding to a training image includes:

inputting the training image into the image recognition model, and performing a feature extraction on the training image, to obtain a corresponding feature image, where resolution of the feature image is lower than the resolution of the training image; and obtaining, based on the image interpolation algorithm and the feature image, the feature intensity image corresponding to the training image.

In some possible embodiments of the present application, the performing a feature extraction on the training image, to obtain a corresponding feature image includes:

downsampling the training image, to obtain a corresponding downsampled image, where resolution of the downsampled image is the same as the resolution of the feature image; and processing the downsampled image based on a weight of a fully connected layer in the image recognition model, to obtain the feature image.

In some possible embodiments of the present application, the to-be-occluded pixel includes at least two pixels including a first pixel and a second pixel, and a distance between the first pixel and the second pixel is greater than or equal to a preset first distance; and the occluding the to-be-occluded pixel by using a preset window, to obtain a new image includes any one of the following:

occluding the first pixel in the training image by using a preset window, to obtain a new image;

occluding the second pixel in the training image by using a preset window, to obtain a new image; and occluding the first pixel in the training image by using a preset first window, and occluding the second pixel in the training image by using a preset second window, to obtain a new image.

In some possible embodiments of the present application, the training image is an image in new images that are last used to update the image recognition model.

In some possible embodiments of the present application, there are a plurality of training images;

the obtaining a feature intensity image corresponding to a training image includes:

obtaining feature intensity images respectively corresponding to the plurality of training images;

the occluding, based on the feature intensity image, a to-be-occluded region in the training image by using a preset window, to obtain a new image includes:

occluding, based on the feature intensity images respectively corresponding to the plurality of training images, respective to-be-occluded regions in the plurality of training images by using preset windows, to obtain a plurality of new images; and the method further includes:

training and updating the image recognition model based on the plurality of new images.

In some possible embodiments of the present application, the training image and the new image have same label information, and the label information is used to indicate objects included in the images or categories of the objects.

According to a second aspect, an embodiment of the present application provides another image processing method. The method includes:

occluding a to-be-occluded region in a training image by using a preset window, to obtain a new image, where the to-be-occluded region is determined based on a feature intensity image corresponding to the training image, and the new image is used to update an image recognition model.

In some possible embodiments of the present application, the to-be-occluded region includes a to-be-occluded pixel.

In some possible embodiments of the present application, before the occluding a to-be-occluded region in a training image by using a preset window, to obtain a new image, the method further includes: obtaining the feature intensity image corresponding to the training image, where an intensity value of a pixel in the feature intensity image is used to indicate importance of the pixel for recognizing the training image, and resolution of the training image is the same as resolution of the feature intensity image.

For content that is not shown or not described in this embodiment of the present application, refer to the foregoing description in the method embodiment in the first aspect. Details are not described herein again.

According to a third aspect, an embodiment of the present application provides another image processing method (model training method). The method includes:

obtaining a plurality of new images, where any one of the plurality of new images is obtained by occluding a to-be-occluded region in a training image by using a preset window;

and training and updating an image recognition model based on the plurality of new images.

In some possible embodiments of the present application, the training image is an image in new images that are last used to update the image recognition model.

For content that is not shown or not described in this embodiment of the present application, refer to the foregoing description in the method embodiment in the first aspect. Details are not described herein again.

According to a fourth aspect, an embodiment of the present application provides another image processing method (model usage method). The method includes:

inputting a to-be-processed image into an image recognition model, to obtain a recognition result corresponding to the to-be-processed image, where the image recognition model is obtained by training with a plurality of new images, and any one of the plurality of new images is obtained by using a preset window to occlude a to-be-occluded region in a training image.

In some possible embodiments, before the inputting a to-be-processed image into an image recognition model, the method further includes: obtaining the image recognition model.

For content that is not shown or not described in this embodiment of the present application, refer to the foregoing description in the method embodiment in the first aspect. Details are not described herein again.

According to a fifth aspect, an embodiment of the present application provides a terminal device. The terminal device includes a function unit configured to perform the method in any one of the first aspect to the fourth aspect.

According to a sixth aspect, an embodiment of the present application provides another terminal device, including a memory and a processor coupled to the memory. The memory is configured to store an instruction, and the processor is configured to execute the instruction. When executing the instruction, the processor performs the method described in any one of the first aspect to the fourth aspect.

In some embodiments of the present application, the terminal device further includes a display coupled to the processor. The display is configured to display an image (for example, a training image or a feature intensity image) under control of the processor.

In some embodiments of the present application, the terminal device further includes a communications interface. The communications interface communicates with the processor. The communications interface is configured to communicate with another device (for example, a server) under control of the processor.

According to a seventh aspect, an embodiment of the present application provides a computer readable storage medium, and the computer readable storage medium stores program code. The program code includes an instruction used to perform the method described in any one of the first aspect to the fourth aspect.

By implementing the embodiments of the present application, a prior-art problem that a model has low accuracy because of limited training data can be resolved, thereby improving accuracy of the model.

BRIEF DESCRIPTION OF DRAWINGS

To describe the technical solutions in the embodiments of the present application or in the prior art more clearly, the following briefly describes the accompanying drawings required for describing the embodiments or the prior art.

DESCRIPTION OF EMBODIMENTS

The following describes the technical solutions in the embodiments of the present application in detail with reference to the accompanying drawings in the present application.

In a process of applying for this application, the applicant finds that, to augment a training sample used for model training, methods such as randomly flipping an image, randomly cropping a plurality of image regions, and randomly perturbing a pixel value of a pixel of an image are usually used to obtain a new training sample. However, in practice, a new training sample obtained through augmentation by using the foregoing methods does not improve accuracy and generalization performance of a model.

Figure 1:
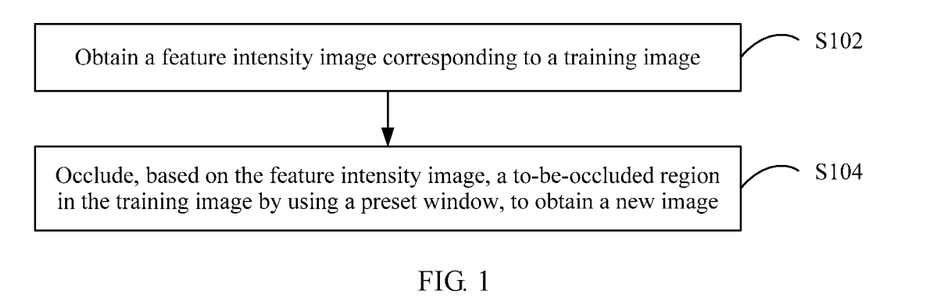
FIG. 1 is a schematic flowchart of an image processing method according to an embodiment of the present application.

To resolve the foregoing problem, this application provides an image processing method and a terminal device applicable to the method. FIG. 1 shows an image processing method according to an embodiment of the present application. As shown in FIG. 1, the method includes the following implementation steps.

Step S102. A terminal device obtains a feature intensity image corresponding to a training image, where an intensity value of a pixel in the feature intensity image is used to indicate importance of the pixel for recognizing the training image, and resolution of the training image is the same as resolution of the feature intensity image.

The feature intensity image is an image in which an intensity (intensity value) of each object (or point) in a scenario for recognizing the scenario is used as a pixel value. In other words, the pixel value of the pixel in the feature intensity image is the intensity value, and is used to reflect/indicate importance of the pixel for recognizing an original image (herein, a training image) corresponding to the feature intensity image.

How the intensity value of the pixel reflects the importance of the pixel for recognizing the training image may be exemplary self-defined on a user side or on a system side.

For example, a larger intensity value of a pixel indicates higher importance of the pixel for recognizing the training image; or a larger intensity value of a pixel indicates lower importance of the pixel for recognizing the training image.

Step S104. The terminal device occludes, based on the feature intensity image, a to-be-occluded region in the training image by using a preset window, to obtain a new image, where the to-be-occluded region includes a to-be-occluded pixel, and the new image is used to train and update an image recognition model.

The terminal device may determine, based on the feature intensity image, the to-be-occluded region in the training image; and then occlude the to-be-occluded region by using the preset window, to obtain the new image. Details are described below.

The preset window is self-defined on the user side or on the system side. Attribute features of the preset window, such as a size and a shape, are not limited in this application. For example, the preset window may be a rectangular window, a triangular window, a sector window, a rhombic window, or the like.

The following describes some exemplary embodiments and optional embodiments in this application.

In step S102, there are a plurality of implementations for the terminal device to obtain the feature intensity image corresponding to the training image. For example, the terminal device may obtain, based on a method for obtaining a preset feature intensity image, the feature intensity image corresponding to the training image, or the terminal device may directly obtain the training image and the feature intensity image corresponding to the training image from another device (for example, a server) through a network. The method for obtaining a feature intensity may be self-defined on a user side or on a system side, and may include but is not limited to obtaining a feature intensity image corresponding to a training image based on sliding window occluding, obtaining a feature intensity image corresponding to a training image based on a gradient, obtaining a feature intensity image corresponding to a training image based on a class activation mapping (CAM) algorithm, or another implementation method for obtaining a feature intensity image. The following describes in detail how to obtain, based on the sliding window occluding, based on the gradient, and based on the CAM, a feature intensity image corresponding to a training image. Details are not described herein.

In step S104, the terminal device may determine the to-be-occluded region in the training image based on intensity values of all pixels in the feature intensity image, where the to-be-occluded region includes one or more to-be-occluded pixels; and then occlude the to-be-occluded region in the training image by using a preset window, to obtain a new image, where the new image is used to train and update an image recognition model.

Specifically, the terminal device may determine, from the feature intensity image according to a preset rule, a pixel whose intensity value meets a preset condition as a mapped pixel; and then determines a pixel corresponding to the mapped pixel in the training image as the to-be-occluded pixel. A region including a plurality of to-be-occluded pixels may be referred to as the to-be-occluded region. The preset rule is self-defined on the user side or on the system side, and the preset rule and the preset condition are associated with each other. For example, when a larger intensity value of the pixel indicates higher importance of the pixel for recognizing an image, a pixel whose intensity value is greater than or equal to a first preset intensity may be selected from the feature intensity image as the mapped pixel. On the contrary, when a smaller intensity value of the pixel indicates higher importance of the pixel for recognizing an image, a pixel whose intensity value is less than or equal to a second preset intensity may be selected from the feature intensity image as the mapped pixel.

The first preset intensity and the second preset intensity may be intensity thresholds that are self-defined on a user side or on a system side, and may be the same or different. This is not limited in this application.

A quantity of the mapped pixels is not limited in this application, and may be one or more. Correspondingly, a quantity of the to-be-occluded pixels may be one or more. In addition, the to-be-occluded pixel and the mapped pixel may be in a one-to-one correspondence, or may not be in a one-to-one correspondence. In other words, the to-be-occluded pixel may be the pixel that is in the training image and that corresponds to the mapped pixel, or may be any one or more of pixels that are in the training image and that correspond to the mapped pixel.

In some embodiments of the present application, the terminal device may alternatively obtain the mapped pixel from the feature intensity image by using a set algorithm and with reference to intensity values of all pixels in the feature intensity image. The set algorithm is self-defined on a user side or on a system side, and is used to obtain, from the feature intensity image, a mapped pixel that meets a preset condition.

The following describes in detail how to determine the mapped pixel from the feature intensity image by using an example in which the set algorithm is a polynomial sampling algorithm. In this example, the feature intensity image includes n pixels. The intensity value of the pixel is represented by $Q_i$, and i is a positive integer less than or equal to n. A larger $Q_i$ indicates higher importance of the pixel for recognizing an image.

In exemplary implementation of this application, the terminal device may first perform normalization processing on the intensity values of the n pixels by using the following formula (1), to obtain intensity values $R_i$ of the pixels that are represented by a probability. To some extent, the probability value also indicates that a probability or a priority at which a pixel is selected as a mapped pixel.

$$R_i = \frac{Q_i}{\sum_{i=1}^{n} Q_i}, i = 1, 2, 3 \ldots, n \qquad \text{Formula (1)}$$

Then, the terminal device may select, from the n pixels based on the intensity values $R_i$ of the pixels, a pixel j that meets the preset condition as the mapped pixel. For example, the terminal device may perform accumulation calculation on $R_i$ by using the following formula (2):

$$s_i = \begin{cases} R_i, i = 1 \\ R_i + R_{i-1}, i > 1 \end{cases} \qquad \text{Formula (2)}$$

In a process of pixel sampling based on the polynomial sampling algorithm, a random number r that meets a 0-to-1 distribution is generated. If $r \leq s_1$, j=1 is returned; that is, a first pixel obtained through sampling is used as the mapped pixel. If $s_{j-1} < r \leq s_j$, j is returned; that is, a jth pixel obtained through sampling is used as the mapped pixel.

It should be understood that when the terminal device needs to obtain a plurality of mapped pixels, a plurality of sampling operations may be performed based on the foregoing sampling principle of the polynomial algorithm, to obtain the plurality of mapped pixels.

In some embodiments of the present application, the terminal device may occlude a to-be-occluded region in the training image by using a preset window, to obtain a new image. Optionally, resolution (or a size) of the to-be-occluded region is greater than or equal to preset resolution (or a preset size).

Figure 2A:
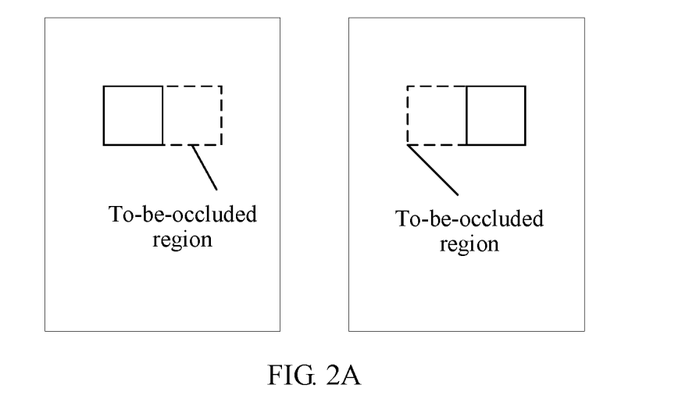
FIG. 2A and FIG. 2B are schematic diagrams of several occluded images according to an embodiment of the present application.

For example, in FIG. 2A, that the preset window is a 64×64 rectangular box is used as an example. The terminal device may occluding the to-be-occluded region in the training image by sliding the 64×64 rectangular box, to obtain a plurality of new images. In the figure, because of a limited size of the to-be-occluded region, two new images are obtained. This is merely an example and does not constitute a limitation herein.

In some embodiments of the present application, the to-be-occluded region includes a to-be-occluded pixel, and the terminal device may occlude the to-be-occluded pixel in the training image by using a preset window, to obtain a new image.

Figure 2B:
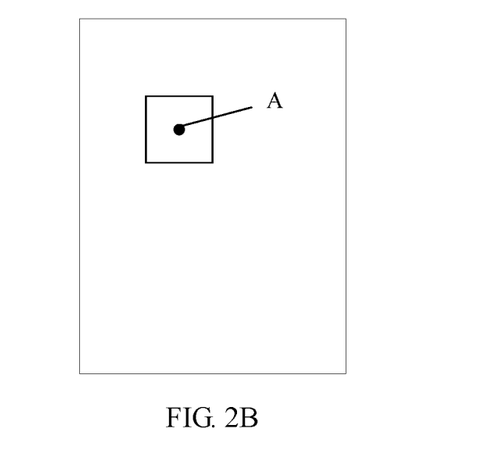

For example, in FIG. 2B, that the preset window is a 64×64 rectangular box with a to-be-occluded pixel A is used as an example. The terminal device may use the to-be-occluded pixel A as a center, and occlude the training image by using the 64×64 rectangular box, to obtain a new image. In actual application, a pixel value of a pixel in an image region occluded by the preset window may be represented by or replaced with a preset pixel value, such as a gray-scale pixel value: 0 or 255. A pixel value of a pixel that is in the training image and that is not occluded by the preset window does not change. Correspondingly, a new image may be formed/obtained.

In some embodiments of the present application, the quantity of the to-be-occluded pixels is not limited in this application, and may be specifically one or more. When there are a plurality of to-be-occluded pixels, the terminal device may occlude the plurality of to-be-occluded pixels by using a preset window, to obtain a new image. Alternatively, the terminal device may separately occlude some of the plurality of to-be-occluded pixels by using a preset window, and not occlude the remaining pixels, to obtain a new image.

In exemplary implementations of this application, when a distance between any two pixels in the plurality of to-be-occluded pixels is relatively short, the terminal device may use the preset window to occlude the plurality of to-be-occluded pixels, to obtain the new image. When the plurality of to-be-occluded pixels include at least two pixels with a relatively long distance, the terminal device may separately occlude the plurality of to-be-occluded pixels by using a plurality of preset windows, to obtain a new image.

For example, that the plurality of to-be-occluded pixels include at least two pixels including a first pixel and a second pixel is used as an example. If a distance between the first pixel and the second pixel is relatively short, for example, the distance is less than or equal to a preset distance (for example, 5 cm), a preset window may be used to occlude both the first pixel and the second pixel, to obtain a new image.

If a distance between the first pixel and the second pixel is relatively long, that is, the distance between the first pixel and the second pixel is greater than or equal to the preset distance, in this case, the terminal device may occlude the first pixel or the second pixel by using a preset window, to obtain a new image. Alternatively, the terminal device may separately occlude the first pixel and the second pixel by using two preset windows, to obtain a new image. For example, the first pixel may be occluded by using a preset first window, and the second pixel may be occluded by using a preset second window, to obtain a new image. The preset first window and the preset second window may be the same or different. This is not limited in this application.

In some embodiments of the present application, the following describes three exemplary implementations of this application for obtaining the feature intensity image corresponding to the training image in S102.

Figure 3:
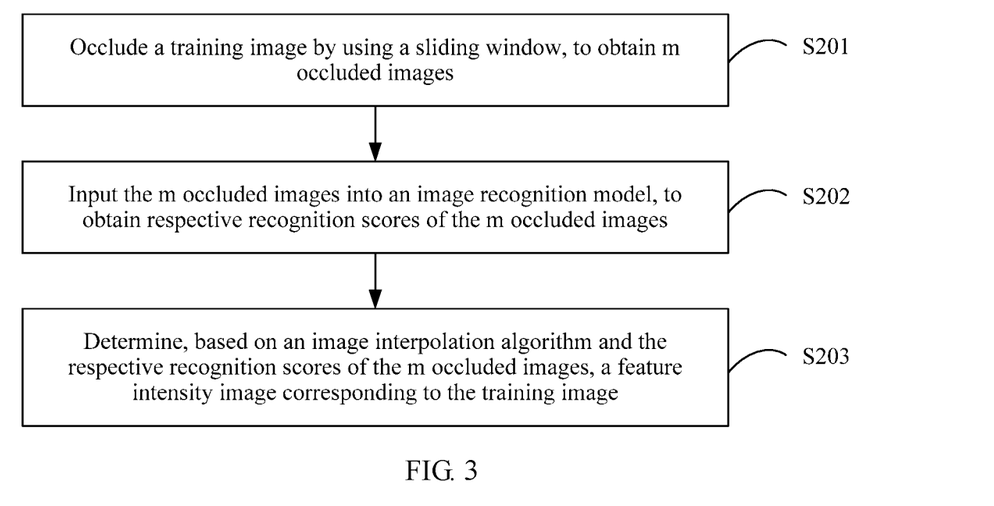
FIG. 3 is a schematic flowchart of a method for obtaining a feature intensity image according to an embodiment of the present application.

In a first implementation, the feature intensity image corresponding to the training image is obtained based on a sliding window. FIG. 3 is a schematic flowchart of a method for obtaining a feature intensity image based on sliding window occluding. The method shown in FIG. 3 includes the following implementation steps.

Step S202. The terminal device occludes the training image by using a sliding window, to obtain m occluded images, where m is a positive integer.

The sliding window may be self-defined on a user side or on a system side, and attribute features of the sliding window, such as a size and a shape, are not limited.

Step S204. The terminal device inputs the m occluded images into the image recognition model, to obtain respective recognition scores of the m occluded images.

Step S206. The terminal device determines, based on an image interpolation algorithm and the respective recognition scores of the m occluded images, the feature intensity image corresponding to the training image.

In step S202, the terminal device may randomly occlude the training image for m times by using the sliding window, to obtain the m occluded images. Alternatively, the terminal device may traverse and occlude the training image by using the sliding window, to obtain the m occluded images.

Specifically, the sliding window may move in the training image based on a set movement line. The set movement line may be self-defined on a user side or on a system side. For example, the sliding window moves from left to right and from top to bottom in a fixed step (one pixel, or the like). Fixed steps moved by the sliding window in a horizontal direction and in a vertical direction may be different, or may be the same. This is not limited in this application. To improve efficiency, a relatively long fixed step may be set, for example, 10 pixels.

Figure 4:
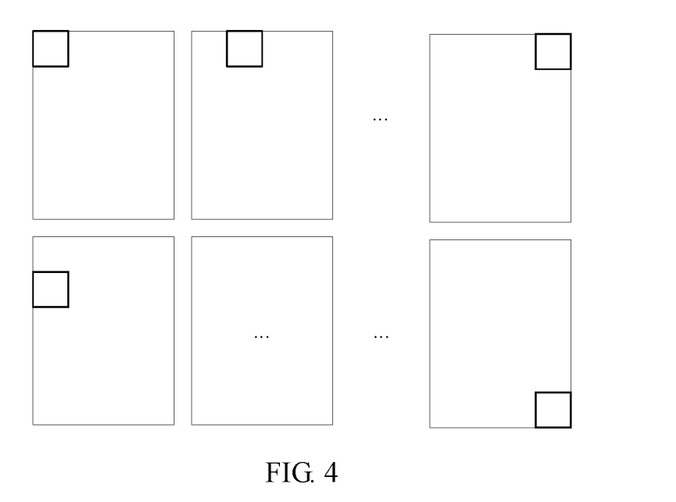
FIG. 4 is a schematic diagram of image occlusion according to an embodiment of the present application.

For example, FIG. 4 is a schematic diagram of traverse occluding of a training image by using a sliding window. As shown in FIG. 4, after the training image is traversed from left to right and from top to bottom by using a rectangular box as the sliding window, the m occluded images can be obtained.

In step S204, the terminal device inputs the m occluded images into a trained image recognition model, to obtain respective recognition scores of the m occluded images. The image recognition model may be specifically an image recognition model obtained during the last training process or an initial image recognition model obtained during the first training process. Training (or iterative training) of the image recognition model is described in detail below in this application.

Optionally, the terminal device may further input the training image into the image recognition model, to obtain a recognition score of the training image, so as to subsequently obtain the feature intensity image corresponding to the training image.

Step S206. The terminal device may determine, based on an image interpolation algorithm and the respective recognition scores of the m occluded images, the feature intensity image of the training image. Specifically, the following several implementations exist.

In some embodiments of the present application, the terminal device may use the respective recognition scores of the m occluded images as recognition scores of m occluded regions in the training image. The occluded region is a region that is in the occluded image and is occluded by the sliding window. The recognition score is used to reflect importance of the occluded region for recognizing the training image.

As shown in FIG. 4, a sliding window is used to occlude different positions in the training image, to obtain m occluded images, that is, m occluded regions. Correspondingly, respective recognition scores subsequently obtained of the m occluded images are respective recognition scores of the m occluded regions. A higher recognition score of the occluded region indicates lower importance of the occluded region for recognizing the training image. On the contrary, a lower recognition score of the occluded region indicates higher importance of the occluded region for recognizing the training image.

Further, the terminal device may correspondingly determine intensity values of the m pixels in the feature intensity image based on the recognition scores of the m occluded regions.

Specifically, the terminal device may consider the occluded region as a pixel; or considers the center point of the occluded region as a pixel. Correspondingly, the recognition score of the occluded region is directly used as an intensity value of the pixel; or the recognition score of the occluded region is preprocessed, and a processing result is used as an intensity value of the pixel.

The preprocessing is self-defined on a user side or on a system side, for example, normalization processing or preset scaling processing. This is not described in detail and limited in this application.

Likewise, the terminal device may determine, based on the recognition scores of the m occluded regions in the training image, the intensity values of the m pixels in the feature intensity image corresponding to the training image.

Further, the terminal device may obtain, based on the image interpolation algorithm and the intensity values of the m pixels in the feature intensity image, intensity values of all pixels in the feature intensity image, to obtain the feature intensity image.

Specifically, the terminal device may perform image interpolation by using the image interpolation algorithm and the intensity values of the m pixels in the feature intensity image, to obtain the intensity values of all the pixels constituting the feature intensity image, so as to obtain the feature intensity image. The image interpolation algorithm is self-defined on a user side or on a system side, for example, a bilinear interpolation algorithm, a Lanczos (Lanczos) interpolation algorithm, a cubic convolution interpolation algorithm, a nearest neighbor interpolation algorithm, a piecewise linear interpolation algorithm, and another algorithm used for image interpolation. How to perform image interpolation by using an image interpolation algorithm to obtain intensity values of all pixels in an image is not described in detail in this application.

That the recognition score is directly used as an intensity value of the pixel is used as an example. In an actual processing process, the terminal device may arrange the recognition scores (that is, m recognition scores) of the m occluded regions into a two-dimensional matrix. Because a size of the two-dimensional matrix is less than resolution of the training image, an image interpolation algorithm needs to be used to interpolate data in the two-dimensional matrix, to obtain a new matrix that has resolution that is the same as the resolution of the training image. The new matrix represents the feature intensity image corresponding to the training image.

It should be noted that, in this embodiment, a larger intensity value of the pixel in the feature intensity image indicates lower importance of the pixel for recognizing the training image. Correspondingly, a smaller intensity value of the pixel in the feature intensity image indicates higher importance of the pixel for recognizing the training image.

In some other embodiments of the present application, the terminal device may determine intensity values of m pixels in an initial intensity image based on the respective recognition scores of the m occluded images. Then, image interpolation is performed by using the image interpolation algorithm and the intensity values of the m pixels in the initial intensity image, to obtain intensity values of all pixels in the initial intensity image, so as to obtain the initial intensity image. For one implementation for obtaining the initial intensity image, refer to related descriptions in the foregoing embodiments. Details are not described herein again.

Further, the terminal device may obtain intensity values of all pixels in the feature intensity image based on the intensity values of all the pixels in the initial intensity image, to obtain the feature intensity image.

Specifically, that the recognition score is an intensity value of the pixel is used as an example. The terminal device may obtain the intensity values of the m pixels in the initial intensity image based on the respective recognition scores of the m occluded images. Then, image interpolation is performed by using the image interpolation algorithm and the intensity values of the m pixels (that is, m recognition scores) in the initial intensity image, to correspondingly obtain the initial intensity image. A larger intensity value (that is, a recognition score) of the pixel in the initial intensity image indicates lower importance of the pixel for recognizing the training image. That is, the intensity value of the pixel is inversely proportional to importance reflected by the intensity value. Therefore, the terminal device may further process the intensity value of the pixel in the initial intensity image, to obtain the intensity value of the pixel in the feature intensity image, so as to obtain the feature intensity image. The intensity value of the pixel in the feature intensity image is proportional to importance reflected by the intensity value. That is, a larger intensity value of the pixel in the feature intensity image indicates higher importance of the pixel for recognizing the training image. On the contrary, a smaller intensity value of the pixel in the feature intensity image indicates lower importance of the pixel for recognizing the training image.

For example, the terminal device may determine, based on the intensity values of all the pixels in the initial intensity image, a target pixel with a largest intensity value in the initial intensity image. Then, the intensity values of all the pixels in the initial intensity image are subtracted from the intensity value of the target pixel, to obtain the intensity values of all the pixels in the feature intensity image, thereby obtaining the feature intensity image.

For another example, the terminal device may determine the intensity values of all pixels in the feature intensity image by using the recognition score of the training image and the intensity values of all the pixels in the initial intensity image, to obtain the feature intensity image. In specific implementation, the following formula (3) may be used to obtain the intensity values of all the pixels in the feature intensity image:

$$D_i = \begin{cases} p_0 - p_i, & \text{if } p_0 > p_i \\ 0, & \text{otherwise} \end{cases} \quad \text{Formula (3)}$$

where $p_0$ is a recognition score of the training image, $p_i$ is an intensity value (recognition score) of an $i^{th}$ pixel in the initial intensity image, i is a positive integer less than or equal to N, and N is a total quantity of pixels in the initial intensity image.

Figure 5:
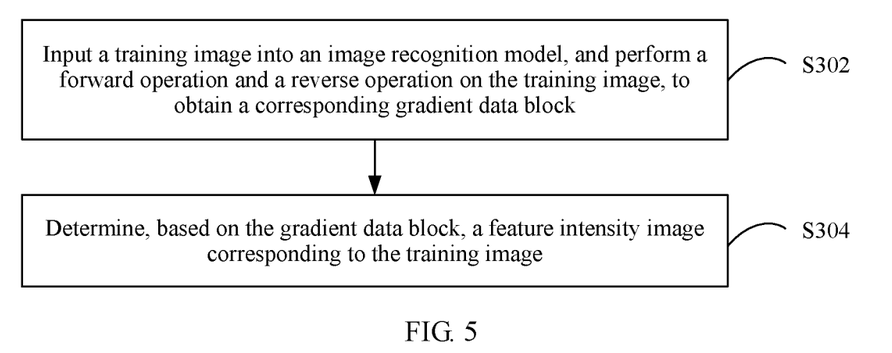
FIG. 5 and FIG. 6 are schematic flowcharts of other two methods for obtaining a feature intensity image according to embodiments of the present application.

In a second implementation, the feature intensity image corresponding to the training image is obtained based on a gradient. FIG. 5 is a schematic flowchart of a method for obtaining a feature intensity image based on a gradient according to an embodiment of the present application. The method shown in FIG. 5 includes the following implementation steps.

Step S302. The terminal device inputs the training image into the image recognition model, and performs a forward operation and a reverse operation on the training image, to obtain a corresponding gradient data block, where a size of the gradient data block is the same as resolution of the training image.

Step S304. The terminal device determines, based on the gradient data block, the feature intensity image corresponding to the training image.

In step S302, the terminal device may input the training image into the image recognition model, and propagate forward the training image, to obtain a recognition score corresponding to the training image, and then reversely propagate the obtained recognition score, to obtain the corresponding gradient data block. Generally, the gradient data block is represented by a C×H×W matrix block, where C is a quantity of channels, and H and W are generally a length and a width of the training image.

Finally, in S304, the terminal device performs operation processing on the gradient data block according to a set rule, to obtain the feature intensity image corresponding to the training image. The set rule is an operation rule that is self-defined on a user side or on a system side, for example, a weighted summation, or performing averaging on the gradient data block along a channel dimension. A new matrix/data block obtained by performing the processing according to the set rule represents the feature intensity image.

For example, the training image is an RGB image, and may be represented by a 3×C×H data block. The terminal device may input the training image into the image recognition model, propagate forward the training image, to obtain a recognition score corresponding to the training image, and then propagate the recognition score of the training image from the front to the back, to obtain a 3×H×W gradient data block. Herein, 3 is a quantity of the channels, and it should be understood that 3×H×W includes three two-dimensional matrices of H×W. Further, the terminal device may perform averaging on the gradient data blocks along the path dimension, to obtain a new matrix of H×W. The new matrix represents the feature intensity image corresponding to the training image.

Figure 6:
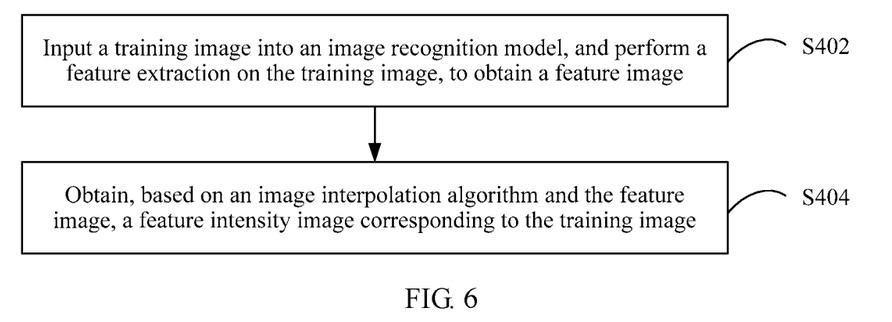

In a third implementation, the feature intensity image corresponding to the training image is obtained based on a CAM. FIG. 6 is a schematic flowchart of a method for obtaining a feature intensity image based on the CAM according to an embodiment of the present application. The method shown in FIG. 6 includes the following implementation steps.

Step S402. The terminal device inputs the training image into the image recognition model, and performs a feature extraction on the training image, to obtain a feature image, where resolution of the feature image is less than resolution of the training image.

Step S404. The terminal device obtains, based on the image interpolation algorithm and the feature image, the feature intensity image corresponding to the training image.

In step S402, the terminal device inputs the training image into the image recognition model, and may perform the feature extraction on the training image by using a network layer (for example, a convolution layer, a pooling layer, and an activation layer) inside the model, to obtain the corresponding feature image. The following describes an example of a specific implementation of S402.

In some embodiments of this application, the terminal device may downsample the training image by using a set network layer in the image recognition model, to obtain a corresponding downsampled image.

The set network layer may be a network layer that is self-defined on a system side and is used to implement an image downsampling function, for example, a convolution layer or a pooling layer. A quantity of the set network layers may be set based on an actual requirement, for example, may be one or more. This is not limited in this application.

For example, the image recognition model is a neural network ResNet-50 model, and the model includes five convolution layers. Correspondingly, after inputting the training image into the ResNet-50, the terminal device may sequentially perform convolutional processing (that is, downsampling) on the training image by using the five convolution layers in the ResNet-50, to obtain an image output by the last convolution layer, and use the image as the downsampled image.

Further, the terminal device may process the downsampled image based on a weight of a fully connected layer in the image recognition model, to obtain the feature image.

That the image recognition is an object recognition (that is, an object included in the image is categorized and recognized) is used as an example. It is assumed that the resolution of the training image is 224×224. The training image is input into the ResNet-50, to obtain a downsampled image output by the fifth convolution layer. The downsampled image is obtained by downsampling the training image for 32 times, and resolution of the downsampled image is ⅟32 of the resolution of the training image, that is, 7×7. In a data processing process, the downsampled image may be represented by 2048×7×7 data blocks, and herein 2048 represents the quantity of channels in the ResNet-50. It should be understood that, for different image recognition models, the quantity of channels set in the model may also be different. Details are not described in this application.

Further, the terminal device may determine, based on label information of the training image, a weight of a to-be-used fully connected layer in the image recognition model, and the weight may be represented by a vector or a matrix. The label information is used to indicate a target category of an object included in the training image. All weights at the fully connected layer may be represented by 2048×W data blocks, where W is a total quantity of the recognition object categories supported by the models. The terminal device may select, from the 2048×W data blocks based on the target category of the object included in the training image, a column of weight data 2048×1 of the target category in the data block, that is, a weight of the to-be-used fully connected layer. Then weighted summation is performed on the downsampled image by using the weight of the selected fully connected layer, so that a two-dimensional matrix (or a new matrix) of 7×7 can be obtained. In this case, the two-dimensional matrix represents the feature image.

In step S404, because the resolution of the feature image is lower than the resolution of the training image, the terminal device may further perform the image interpolation on the feature image by using an image interpolation algorithm, to obtain a feature intensity image corresponding to the training image. How to obtain the feature intensity image by using the image interpolation algorithm is not described in detail herein.

The following describes some optional embodiments in this application.

In some embodiments of the present application, the new image and the training image have same label information, and the label information is used to indicate objects included in the images, or categories of the objects included in the images. That the object is a pedestrian is used as an example. The label information may be used to represent/distinguish identifier information of the pedestrian, for example, a name and an ID of the pedestrian.

In some embodiments of the present application, the terminal device may further obtain a plurality of new images. For how to obtain the new images, refer to related descriptions in the foregoing embodiments. Details are not described herein again. Further, the terminal device may train and update the image recognition model by using the plurality of new images.

Specifically, before training the image recognition model, the terminal device may obtain a training sample set. The training sample set may include a plurality of training images and a plurality of new images corresponding to the plurality of training images, and one training image may correspond to one or more new images. Then, the to-be-trained image recognition model is obtained, and related parameters used during model training, such as a learning rate and a quantity of iterations, may be further set. Further, the terminal device may train and update the image recognition model by using the image in the training sample set. How to train and update the image recognition model is not described in detail herein.

Optionally, in an iterative training process, the training image may be an image in new images that are last used to train/update the image recognition model. That is, in the iterative training process, the training sample set used for each training process may be a new image generated after all or some images in the training sample set that are last used for training the image recognition model are occluded. Optionally, all or some images in the training sample set may be further used.

For example, two iterative training processes are used as an example. It is assumed that an initial image recognition model is obtained by performing training on a training image A and a training image B. Referring to the foregoing method for obtaining a new image, the training image A may be occluded to obtain new images C and D, and the training image B may be occluded to obtain new images E and F. Then, in the first iterative training process, the terminal device may train and update the image recognition model by using the training images A and B and the new images C, D, E, and F. In the second iterative training process, the terminal device may use the six images A to F as training images required in the second iterative training process, and also separately occlude the six images, based on the foregoing method for obtaining a new image, to obtain six new images. The image recognition model obtained through the first iteration can be trained and updated again by using the six obtained new images and the six original training images (12 images in total). A quantity of images in this example is merely an example, and does not constitute a limitation. In an actual training process of the model, training images that need to be used far exceeds a quantity of the example training images. How to train the image recognition model is not described in detail in this application.

In some embodiments of the present application, the image recognition model is used to recognize an image, and may include but is not limited to recurrent neural networks model, recursive neural networks model, deep neural networks model, convolutional neural networks model, deep generative models, deep belief networks model, generative adversarial networks model, or another model used to recognize an image.

In some embodiments of the present application, the terminal device may input the to-be-processed image into a trained image recognition model, to obtain a recognition result corresponding to the to-be-processed image.

Specifically, in different application scenarios, the to-be-processed image may have different recognition results. For example, in an object categorization scenario, the to-be-processed image includes a to-be-recognized object, and the recognition result may include a recognition category corresponding to the object and a recognition score. For another example, in a scenario of determining whether the image is a preset image, the recognition result may be used to indicate whether the to-be-processed image is a preset image, or the like.

In some embodiments of the present application, the recognition score in this application may be normalized data (or a probability). Specifically, a softmax function is designed in the image recognition model, to implement data normalization. Details are not described herein.

In some embodiments of the present application, the following describes two application scenarios that are applicable to this application.

In one scenario, a target object is tracked based on a large quantity of videos (images). Specifically, features of the large quantity of videos (images) are compared by using an image that includes the target object, to find the target object from the large quantity of videos, so as to obtain a moving track of the target object. Optionally, after the target object is found, a warning may be immediately provided, thereby improving efficiency of image processing, and saving time.

In another scenario, an identity of a target object in a video (an image) is recognized. In a specific scenario, for example, in a scenario in which a human face in a human image is facing a backward direction or a side direction or is blurred, identity authentication may be implemented by performing positioning and similarity comparison on the target object based on a re-recognition technology. Optionally, identity authentication and recognition of the target object may be alternatively performed by using a biometric feature recognition technology, such as attribute recognition (for example, a human body shape or clothing), and gait recognition (a human walking gesture, and the like).

By implementing this embodiment of the present application, a prior-art problem that a model has low accuracy or has poor generalization performance because of limited training data can be resolved.

The foregoing mainly describes the solutions provided in the embodiments of the present application from a perspective of implementing depth prediction module training by a terminal device. It should be understood that, to implement the foregoing functions, the terminal device includes corresponding hardware structures and/or software modules for performing the functions. With reference to the units and algorithm steps described in the embodiments disclosed in the present application, the embodiments of the present application can be implemented in a form of hardware or a combination of hardware and computer software. Whether a function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the embodiments of the present application.

In the embodiments of the present application, the terminal device may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in this embodiment of the present application, unit division is merely an example, and is merely a logical function division. In actual implementation, another division manner may be used.

Figure 7A:
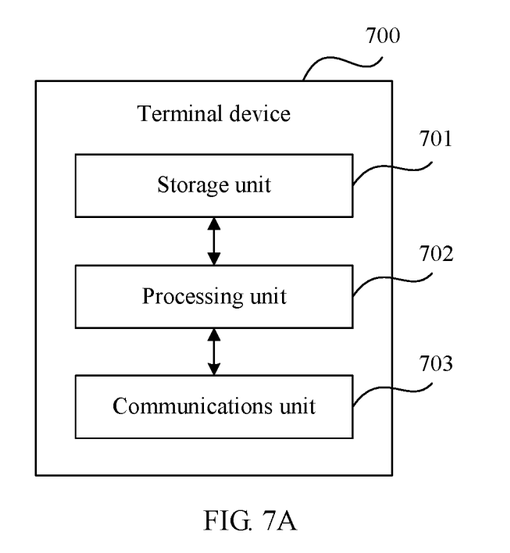
FIG. 7A and FIG. 7B are schematic structural diagrams of two types of terminal devices according to embodiments of the present application.

When an integrated unit is used, FIG. 7A is a possible schematic structural diagram of the terminal device in the foregoing embodiments. A terminal device 700 includes a processing unit 702 and a communications unit 703. The processing unit 702 is configured to control and manage an action of the terminal device 700. For example, the processing unit 702 is configured to support the terminal device 700 in performing steps S102 to S104 in FIG. 1, and steps S202 to S206 in FIG. 3, steps S302 to S304 in FIG. 5, and steps S402 to S404 in FIG. 6, and/or is configured to perform another step of the technology described in this specification. The communications unit 703 is configured to support communication between the terminal device 700 and another device. For example, the communications unit 703 is configured to support the terminal device 700 in obtaining an image (for example, a training image, a to-be-processed image, or a feature intensity image) from a network device, and/or is configured to perform another step of the technology described in this application. Optionally, the terminal device 700 may further include a storage unit 701, configured to store program code and data of the terminal device 700.

The processing unit 702 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The controller/processor may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a general name and may include one or more interfaces, for example, an interface between the network device and another device. The storage unit 701 may be a memory.

Optionally, the terminal device 700 may further include a display unit (not shown in the figure). The display unit may be configured to preview or display an image; for example, the display unit is configured to display a training image, a to-be-processed image, or a feature intensity image. In actual application, the display unit may be a display, a player, or the like. This is not limited in this application.

Figure 7B:
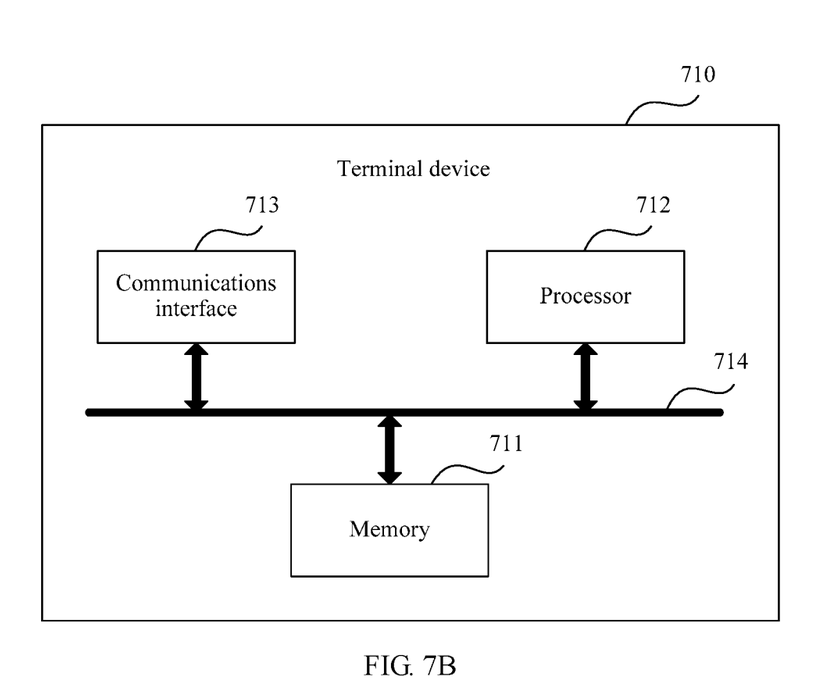

When the processing unit 702 is a processor, the communications unit 703 is a communications interface, and the storage unit 701 is a memory, the terminal device in this embodiment of the present application may be a terminal device shown in FIG. 7B.

As shown in FIG. 7B, the terminal device 710 includes a processor 712, a communications interface 713, and a memory 77. Optionally, the terminal device 710 may further include a bus 714. The communications interface 713, the processor 712, and the memory 77 are interconnected by using the bus 714. The bus 714 may be a peripheral component interconnect (PCI) bus, an extended industry standard architecture (EISA) bus, or the like. The bus 714 may be classified into an address bus, a data bus, a control bus, and the like. For ease of representation, only one thick line is used to represent the bus in FIG. 7B, but this does not mean that there is only one bus or only one type of bus.

For exemplary implementation of the terminal device shown in FIG. 7A or FIG. 7B, refer to corresponding descriptions in the foregoing method embodiments. Details are not described herein again.

Methods or algorithm steps described in combination with the content disclosed in this embodiment of the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device. Certainly, the processor and the storage medium may exist in the terminal device as discrete components.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a RAM, a magnetic disk, or a compact disc.

What is claimed is:

1. An image processing method applied to a terminal, the method comprising:
  obtaining a feature intensity image associated with a training image, wherein an intensity value of a pixel in the feature intensity image indicates importance of the pixel for recognizing the training image, and resolution of the training image is the same as resolution of the feature intensity image; and occluding, based on the feature intensity image, a to-be-occluded region in the training image by using a preset window to obtain a new image, wherein the to-be-occluded region comprises a to-be-occluded pixel, and the new image is used to update an image recognition model.

2. The method according to claim 1, wherein occluding the to-be-occluded region in the training image comprises:

determining a mapped pixel based on the intensity value of the pixel in the feature intensity image, wherein the mapped pixel is a pixel that is in the feature intensity image and whose intensity value meets a preset condition; and occluding the to-be-occluded pixel by using a preset window to obtain the new image, wherein the to-be-occluded pixel is a pixel that is in the training image and that is associated with the mapped pixel.

3. The method according to claim 2, wherein the mapped pixel is obtained by using a polynomial sampling algorithm.

4. The method according to claim 2, wherein the to-be-occluded pixel comprises at least a first pixel and a second pixel, wherein a distance between the first pixel and the second pixel is greater than or equal to a preset first distance; and occluding the to-be-occluded pixel by using the preset window to obtain the new image comprises any one of the following:

occluding the first pixel in the training image by using a preset window to obtain a new image;

occluding the second pixel in the training image by using a preset window to obtain a new image; and occluding the first pixel in the training image by using a preset first window, and occluding the second pixel in the training image by using a preset second window to obtain a new image.

5. The method according to claim 1, wherein obtaining the feature intensity image associated with the training image comprises:

occluding the training image by using a sliding window to obtain m occluded images, wherein m is a positive integer;

inputting the m occluded images into the image recognition model to obtain respective recognition scores of the m occluded images, wherein the recognition scores to reflect importance of regions occluded by the sliding window in the occluded images for recognizing the training image; and determining, based on an image interpolation algorithm and the respective recognition scores of the m occluded images, the feature intensity image associated with the training image.

6. The method according to claim 5, wherein determining the feature intensity image associated with the training image comprises:

determining, based on the respective recognition scores of the m occluded images, intensity values of m pixels in the feature intensity image; and determining, based on the image interpolation algorithm and the intensity values of the m pixels in the feature intensity image, intensity values of all pixels in the feature intensity image, to obtain the feature intensity image.

7. The method according to claim 5, wherein determining the feature intensity image associated with the training image comprises:

determining, based on the respective recognition scores of the m occluded images, intensity values of m pixels in an initial intensity image;

determining, based on the image interpolation algorithm and the intensity values of the m pixels in the initial intensity image, intensity values of all pixels in the initial intensity image; and determining, based on the recognition scores of the training image and the intensity values of all the pixels in the initial intensity image, intensity values of all pixels in the feature intensity image, to obtain the feature intensity image, wherein the recognition scores of the training image are obtained by inputting the training image into the image recognition model.

8. The method according to claim 1, wherein obtaining the feature intensity image associated with the training image comprises:

inputting the training image into the image recognition model and performing a forward operation and a reverse operation on the training image to obtain a gradient data block associated with the training image, wherein a size of the gradient data block is the same as the resolution of the training image; and determining, based on the gradient data block, the feature intensity image associated with the training image.

9. The method according to claim 1, wherein obtaining the feature intensity image associated with the training image comprises:

inputting the training image into the image recognition model and performing a feature extraction on the training image to obtain a feature image associated with the training image, wherein resolution of the feature image is lower than the resolution of the training image; and obtaining, based on the image interpolation algorithm and the feature image, the feature intensity image associated with the training image.

10. The method according to claim 9, wherein performing the feature extraction on the training image to obtain the feature image comprises:

downsampling the training image to obtain an associated downsampled image, wherein resolution of the associated downsampled image is the same as the resolution of the feature image; and processing the associated downsampled image based on a weight of a fully connected layer in the image recognition model to obtain the feature image.

11. A terminal device comprising:

at least one processor; and a non-transitory computer-readable storage medium coupled to the at least one processor and storing programming instructions for execution by the at least one processor, the programming instructions instruct the at least one processor to perform the following operations:

obtaining a feature intensity image associated with a training image, wherein an intensity value of a pixel in the feature intensity image indicates importance of the pixel for recognizing the training image, and resolution of the training image is the same as resolution of the feature intensity image; and occluding, based on the feature intensity image, a to-be-occluded region in the training image by using a preset window to obtain a new image, wherein the to-be-occluded region comprises a to-be-occluded pixel, and wherein the new image is used to update an image recognition model.

12. The terminal device according to claim 11, wherein the programming instructions further instruct the at least one processor to perform the following operations:
determining a mapped pixel based on the intensity value of the pixel in the feature intensity image, wherein the mapped pixel is a pixel that is in the feature intensity image and whose intensity value meets a preset condition; and
occluding the to-be-occluded pixel by using a preset window to obtain the new image, wherein the to-be-occluded pixel is a pixel that is in the training image and that is associated with the mapped pixel.

13. The terminal device according to claim 12, wherein the mapped pixel is obtained by using a polynomial sampling algorithm.

14. The terminal device according to claim 11, wherein the programming instructions further instruct the at least one processor to perform the following operations:
occluding the training image by using a sliding window, to obtain m occluded images, wherein m is a positive integer;
inputting the m occluded images into the image recognition model to obtain respective recognition scores of the m occluded images, wherein the recognition scores reflect importance of regions occluded by the sliding window in the occluded images for recognizing the training image; and
determining, based on an image interpolation algorithm and the respective recognition scores of the m occluded images, the feature intensity image associated with the training image.

15. The terminal device according to claim 14, wherein the programming instructions instruct the at least one processor to perform the following operations:
determining, based on the respective recognition scores of the m occluded images, intensity values of m pixels in the feature intensity image; and
determining, based on the image interpolation algorithm and the intensity values of the m pixels in the feature intensity image, intensity values of all pixels in the feature intensity image to obtain the feature intensity image.

16. The terminal device according to claim 14, wherein the programming instructions instruct the at least one processor to perform the following operations:
determining, based on respective recognition scores of the m occluded images, intensity values of m pixels in an initial intensity image;
determining, based on the image interpolation algorithm and the intensity values of the m pixels in the initial intensity image, intensity values of all pixels in the initial intensity image; and
determining, based on the recognition scores of the training image and the intensity values of all the pixels in the initial intensity image, intensity values of all pixels in the feature intensity image to obtain the feature intensity image, wherein the recognition scores of the training image are obtained by inputting the training image into the image recognition model.

17. The terminal device according to claim 11, wherein the programming instructions instruct the at least one processor to perform the following operations:
inputting the training image into the image recognition model and perform a forward operation and a reverse operation on the training image to obtain a gradient data block associated with the training image, wherein a size of the gradient data block is the same as the resolution of the training image; and
determining, based on the gradient data block, the feature intensity image corresponding to the training image.

18. The terminal device according to claim 11, wherein the programming instructions instruct the at least one processor to perform the following operations:
inputting the training image into the image recognition model and perform a feature extraction on the training image to obtain a feature image associated with the training image, wherein resolution of the feature image is lower than the resolution of the training image; and
obtaining, based on the image interpolation algorithm and the feature image, the feature intensity image associated with the training image.

19. The terminal device according to claim 18, wherein the programming instructions instruct the at least one processor to perform the following operations:
downsampling the training image to obtain a downsampled image associated with the training image, wherein resolution of the downsampled image is the same as the resolution of the feature image; and
processing the downsampled image based on a weight of a fully connected layer in the image recognition model to obtain the feature image.

20. A non-transitory computer readable storage medium that stores a computer program that, when the computer program is executed by a processor of a terminal device, cause the terminal device to provide an image processing method comprising:
obtaining a feature intensity image associated with a training image, wherein an intensity value of a pixel in the feature intensity image indicates importance of the pixel for recognizing the training image, and resolution of the training image is the same as resolution of the feature intensity image; and
occluding, based on the feature intensity image, a to-be-occlude region in the training image by using a preset window to obtain a new image, wherein the to-be-occluded region comprises a to-be-occluded pixel, and the new image is used to update an image recognition model.

* * * * *

UNITED STATES PATENT AND TRADEMARK OFFICE
CERTIFICATE OF CORRECTION

| | |
|---|---|
| PATENT NO. | : 11,836,619 B2 |
| APPLICATION NO. | : 17/039544 |
| DATED | : December 5, 2023 |
| INVENTOR(S) | : Feng et al. |

It is certified that error appears in the above-identified patent and that said Letters Patent is hereby corrected as shown below:

In the Claims

Claim 5: Column 19, Line 49: "to reflect importance of regions occluded by the sliding" should read -- reflect importance of regions occluded by the sliding --.

Signed and Sealed this
Twelfth Day of March, 2024

Katherine Kelly Vidal
*Director of the United States Patent and Trademark Office*